(12) United States Patent
Andreatta

(10) Patent No.: US 10,518,305 B2
(45) Date of Patent: Dec. 31, 2019

(54) METHOD AND APPARATUS FOR ROLLING METAL PRODUCTS

(71) Applicant: Danieli & C. Officine Meccaniche S.P.A., Buttrio (IT)

(72) Inventor: Daniele Andreatta, Borso del Grappa (IT)

(73) Assignee: Danieli & C. Officine Meccaniche S.P.A., Buttrio (IT)

( * ) Notice: Subject to any disclaimer, the term of this patent is extended or adjusted under 35 U.S.C. 154(b) by 579 days.

(21) Appl. No.: 15/293,809

(22) Filed: Oct. 14, 2016

(65) Prior Publication Data

US 2017/0106417 A1    Apr. 20, 2017

(30) Foreign Application Priority Data

Oct. 16, 2015  (IT) .................. 102015000062683

(51) Int. Cl.
*B21B 1/16*    (2006.01)
*B21B 13/10*   (2006.01)
*B21B 13/00*   (2006.01)
*B21B 45/00*   (2006.01)

(52) U.S. Cl.
CPC .............. *B21B 1/16* (2013.01); *B21B 13/00* (2013.01); *B21B 13/103* (2013.01); *B21B 45/004* (2013.01)

(58) Field of Classification Search
CPC .. B21B 1/16; B21B 1/18; B21B 13/10; B21B 13/103; B21B 27/024; B21B 13/02; B21B 13/04; B21B 13/08; B21B 2261/10
See application file for complete search history.

(56) References Cited

U.S. PATENT DOCUMENTS

| 271,225 | A | * | 1/1883 | Daniels | ..................... B21B 1/18 |
| | | | | | 72/235 |
| 706,993 | A | * | 8/1902 | Nighman | ................ B21B 1/088 |
| | | | | | 72/221 |
| 2,369,730 | A | * | 2/1945 | Fisk | .......................... B21B 1/18 |
| | | | | | 72/201 |
| 2,400,690 | A | * | 5/1946 | Fisk | .......................... B21B 1/09 |
| | | | | | 72/181 |
| 4,813,257 | A | * | 3/1989 | Feldmann | ............. B21B 13/103 |
| | | | | | 72/199 |
| 6,092,408 | A | * | 7/2000 | Fabris | ....................... B21B 1/18 |
| | | | | | 72/235 |

(Continued)

FOREIGN PATENT DOCUMENTS

DE          747 811         10/1944

OTHER PUBLICATIONS

Wolfram Math World, "Rhombus", Apr. 24, 2019.*

*Primary Examiner* — Edward T Tolan
(74) *Attorney, Agent, or Firm* — BakerHostetler

(57) ABSTRACT

Method for rolling metal products comprising a plurality of sequential rolling passes during which a metal product (P) is rolled. The method comprises a first rolling pass of the metal product (P) to obtain a first intermediate product (P1), a second rolling pass of the first intermediate product (P1) to obtain a second intermediate product (P2), a third rolling pass of the second intermediate product (P2) to obtain a third intermediate product (P3), a fourth rolling pass of the third intermediate product (P3) to obtain a final rolled product (L).

12 Claims, 2 Drawing Sheets

(56) References Cited

U.S. PATENT DOCUMENTS

| | | | | |
|---|---|---|---|---|
| 6,205,835 B1* | 3/2001 | Balve | .................. | B21B 1/18 72/226 |
| 6,216,517 B1* | 4/2001 | Hein | .................. | B21B 1/18 72/225 |
| 6,546,777 B2* | 4/2003 | Shore | .................. | B21B 1/18 72/200 |
| 7,647,804 B2* | 1/2010 | Inoue | .................. | B21B 1/18 72/225 |

* cited by examiner

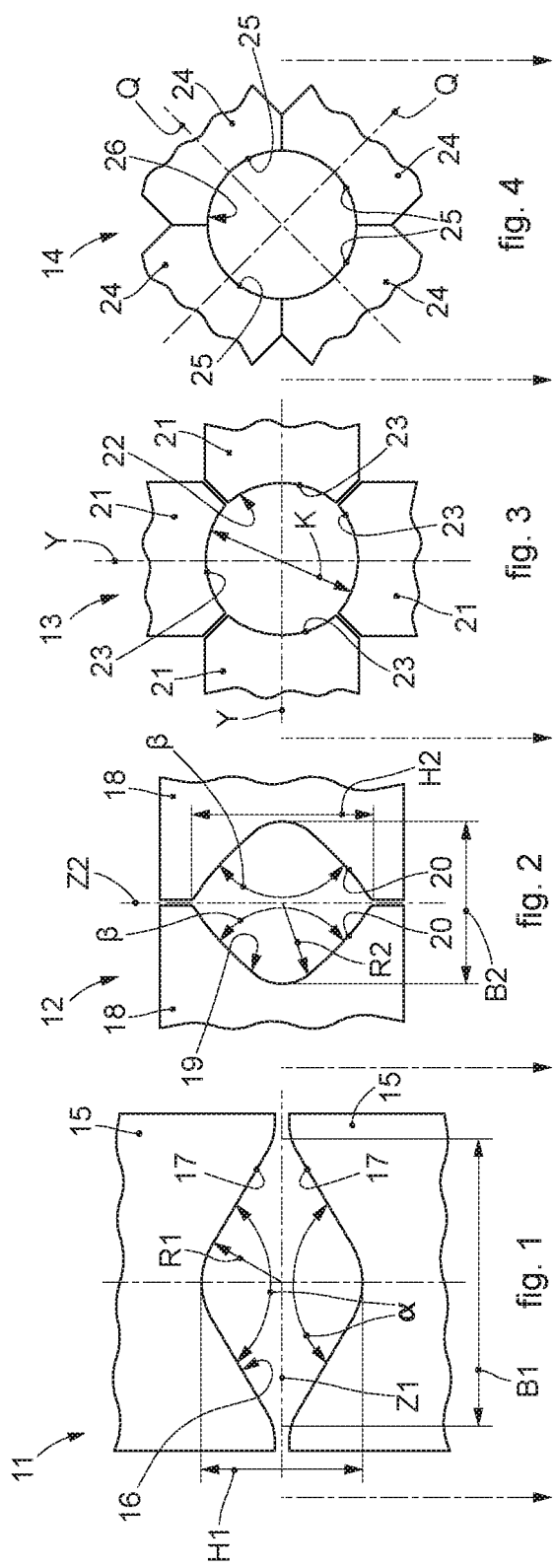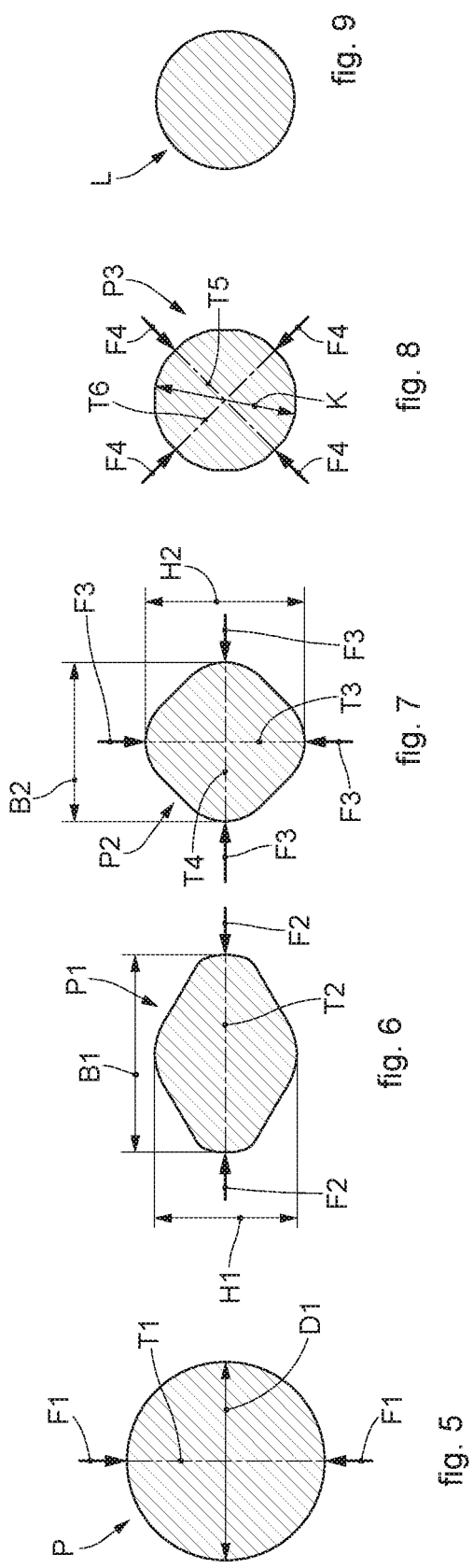

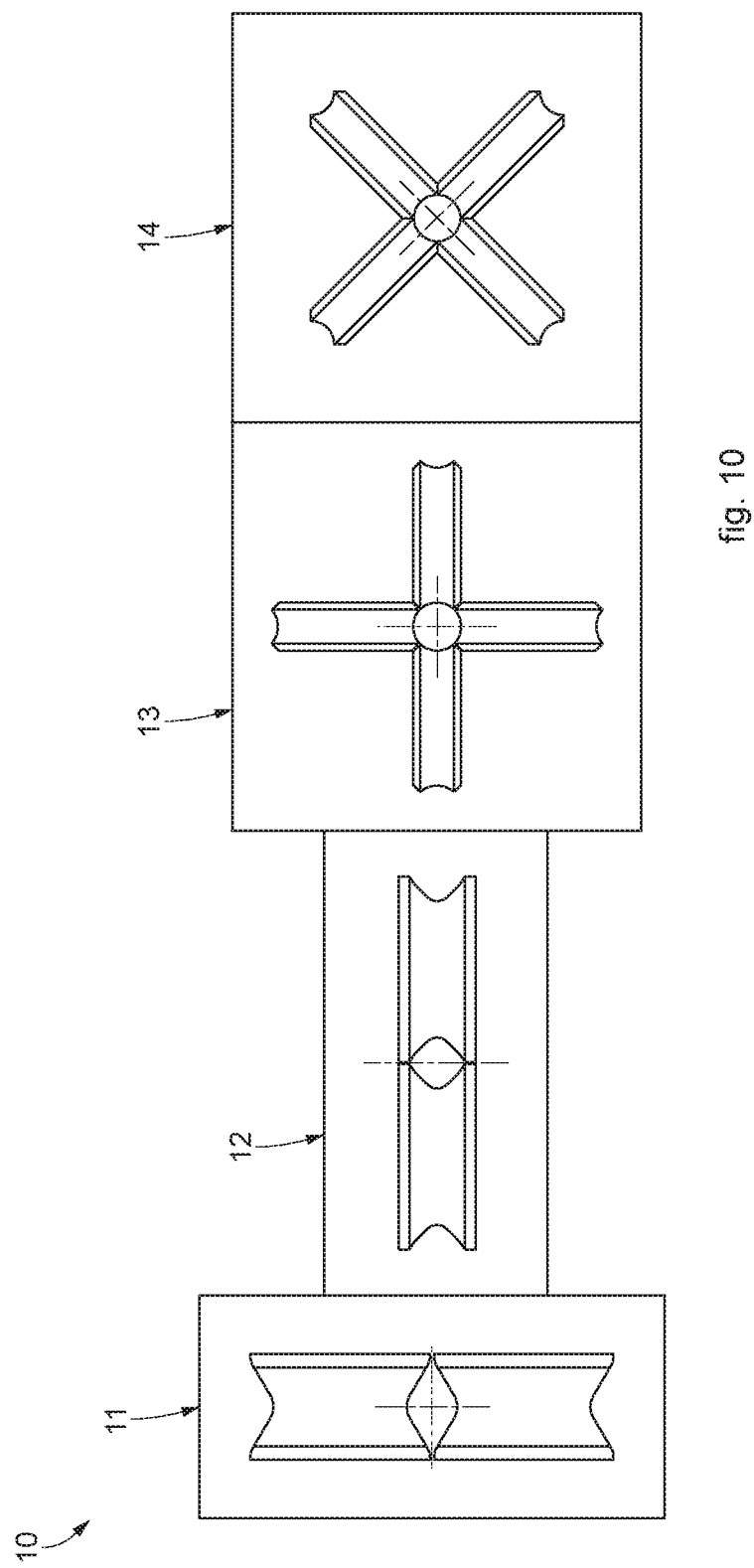

METHOD AND APPARATUS FOR ROLLING METAL PRODUCTS

CROSS REFERENCE TO RELATED APPLICATIONS

This application claims priority under 35 U.S.C. § 119 from Italian Patent Application No. 102015000062683, filed on Oct. 16, 2015 with the Italian Patents and Trademarks Office, Italy, the contents of which are incorporated herein by reference.

TECHNICAL FIELD

The present invention concerns a method for rolling metal products to obtain long products such as bars, round pieces, and rods, with a round cross section shape, or similar to round.

In particular, the invention is applied, although not exclusively, in finishing rolling apparatuses, also called calibration apparatuses.

The present invention allows to obtain a suitably calibrated rolled product, which respects extremely narrow tolerance limits in both geometry and size

BACKGROUND

Different rolling methods are known, which allow to roll and calibrate metal products through a plurality of sequential passes.

For example, a hot rolling method is known for long products, which usually comprises four consecutive rolling passes to roll a metal product with a round section, and to obtain a rolled product always with a round section and a reduced diameter compared to the entering metal product.

The method provides a prior step of heating the metal product to a temperature comprised between 650° C. and 1250° C.

Subsequently, a first rolling pass is provided in which the entering metal product is deformed and rolled, to pass from an initial round section to an oval or elliptical section.

A second rolling pass is then provided in which the metal product is again deformed to obtain a round cross section shape, by means of a compression of the product in opposite directions with respect to the first rolling pass.

The first and second rolling pass induce on the product a great deformation, with a high percentage of reduction in section, which homogenizes the granular structure of the cross section from the center to the periphery.

The first and second rolling passes are made by a first rolling stand and a second rolling stand, each having two rolling rolls. The rolling rolls of the first rolling stand have their axes of rotation substantially orthogonal with respect to the axes of the rolling rolls of the second rolling stand.

Furthermore, the rolling rolls of the first rolling stand define between them a passage gap, with an oval shape, while the rolling rolls of the second rolling stand are provided with semi-circular throats to define a passage gap with a round shape.

A third and a fourth rolling pass are then provided, in which the product is rolled, progressively reducing its section and keeping it with a substantially round shape.

In particular, the fourth rolling pass obtains a calibration of the metal product so that it respects predefined tolerances of size and shape.

The third and fourth rolling passes are performed using a third and respectively a fourth rolling stand, each provided with three or four rolling rolls disposed angularly distanced from each other.

In particular, the rolling rolls of the third rolling stand have an offset angular disposition with respect to the rolling rolls of the fourth rolling stand.

One disadvantage of the solution described above is that obtaining a round cross section shape already in the second rolling pass penalizes the subsequent rolling steps downstream. In fact, to be able to conclude rolling in the fourth pass, and without further rolling passes, both the third and the fourth pass must have a rather narrow and arched channel between the rolling rolls. This entails an increase in the possibility of pinching the profile during the further rolling and section reduction, with a consequent deterioration in the quality of the rolled product.

DE 747 811 also discloses a rolling method in which five rolling passes are performed. In particular, the metal product is subjected to sequential rolling passes that modify progressively its cross section. The cross sections are, in sequence, a quadrangular-shaped cross section, a lozenge-shaped cross section, a quadrangular-shaped cross section, an elliptical-shaped cross section and, finally, a round-shaped cross section. This solution, however, is very expensive due to the high number of rolling passes performed, and provides a final product with imprecise final dimensions. In particular, the high deformations induced in the metal product, during the passage between the elliptical cross section and the round cross section, do not allow to obtain a calibrated final round product.

One purpose of the present invention is to perfect a rolling method for metal products that allows to obtain rolled products with excellent qualities of size and shape.

Another purpose of the present invention is to perfect a rolling method that allows to increase the mechanical resistance of the rolled product.

Another purpose of the present invention is to obtain a rolling method for rolled products that allows to increase the rolling action induced on the metal products.

Another purpose of the present invention is to perfect a rolling method for metal products that allows to extend the range of sizes of the metal products, starting from the same initial diameter. This means that, without changing the rolling rolls or the sizes of the passage gap, it is possible to calibrate several products, obtaining different exit diameters from the same entrance diameter.

The Applicant has devised, tested and embodied the present invention to overcome the shortcomings of the state of the art and to obtain these and other purposes and advantages.

SUMMARY

The present invention is set forth and characterized in the independent claims, while the dependent claims describe other characteristics of the invention or variants to the main inventive idea.

In accordance with the above purposes, a method for rolling metal products comprises a plurality of sequential rolling passes during which a metal product is rolled, In accordance with one aspect of the present invention the method comprises:
 a first rolling pass of the metal product to obtain a first intermediate product with a lozenge-shaped cross section, with opposite angles equal to each other and different adjacent angles;

a second rolling pass of the first intermediate product to obtain a second intermediate product with a quadrangular shape of the cross section with angles substantially equal to each other;

a third rolling pass of the second intermediate product to obtain a third intermediate product with a round shape of the cross section, not finished;

a fourth rolling pass of the third intermediate product to obtain a final rolled product with a round, calibrated shape of the cross section.

This combination of rolling passes allows to obtain final rolled products that respect strict limits of tolerance both in size and geometry, for example on the oval shape of the rolled product.

Moreover, the solution allows to exert a heavy rolling action on the metal product mainly in the first two passes and, with the subsequent third and fourth passes, to obtain the rolled product in its finished shape.

Indeed, in the first two rolling passes, the necessary rolling actions to obtain the lozenge and then quadrangular profiles cause an internal deformation of the cross section that is homogeneous throughout its whole thickness. This condition allows to increase the mechanical resistance of the final rolled product.

The quadrangular shape of the cross section at exit from the second rolling pass allows to obtain an excellent control of the guide of the product in the passes that occur downstream, preventing displacements of the material inside the rolling channels that can compromise reaching determinate and desired levels of quality.

Moreover, this configuration allows to limit the number of components of a rolling apparatus, thus limiting production costs of the latter, maintenance interventions and replacement of components.

The present invention also concerns an apparatus for rolling metal products that comprises a plurality of rolling units.

In accordance with one aspect of the present invention, the apparatus comprises:

a first rolling unit provided with first rolling rolls defining a first rolling channel with a lozenge shape, with opposite angles equal to each other and different adjacent angles;

a second rolling unit provided with second rolling rolls defining a second rolling channel with a quadrangular shape, with angles substantially equal to each other;

a third rolling unit provided with third rolling rolls defining a third rolling channel with a circular shape;

a fourth rolling unit provided with fourth rolling rolls defining a fourth rolling channel with a circular shape.

BRIEF DESCRIPTION OF THE DRAWINGS

These and other characteristics of the present invention will become apparent from the following description of some embodiments, given as a non-restrictive example with reference to the attached drawings wherein:

FIG. 1 is a schematic illustration of a first rolling unit of a rolling apparatus according to the present invention;

FIG. 2 is a schematic illustration of a second rolling unit of a rolling apparatus according to the present invention;

FIG. 3 is a schematic illustration of a third rolling unit of a rolling apparatus according to the present invention;

FIG. 4 is a schematic illustration of a fourth rolling unit of a rolling apparatus according to the present invention;

FIG. 5 is a cross section of a metal product to be rolled in the rolling apparatus according to the present invention;

FIG. 6 is a cross section of the rolled product exiting from the first rolling unit;

FIG. 7 is a cross section of the rolled product exiting from the second rolling unit;

FIG. 8 is a cross section of the rolled product exiting from the third rolling unit;

FIG. 9 is a cross section of the rolled product exiting from the fourth rolling unit;

FIG. 10 is a schematic illustration of a rolling apparatus according to the present invention.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF ILLUSTRATIVE EMBODIMENTS

With reference to the attached drawings we shall now describe possible embodiments of a method and apparatus 10 for rolling metal products.

FIGS. 1-4 show possible embodiments of rolling units of the rolling apparatus 10 configured to roll an initial metal product P (FIG. 5) and obtain a rolled product L exiting from the rolling apparatus 10 (FIG. 9).

According to one aspect of the present invention, the rolling apparatus 10 according to the present invention comprises four rolling units, respectively a first rolling unit 11 (FIG. 1), a second rolling unit 12 (FIG. 2), a third rolling unit 13 (FIG. 3) and a fourth rolling unit 14 (FIG. 4).

According to a possible solution, the rolling apparatus 10 according to the present invention consists of only four rolling units, namely consists of only said first rolling unit 11, said second rolling unit 12, said third rolling unit 13 and said fourth rolling unit 14. Accordingly, a possible solution of the present invention provides that also the method for rolling metal products consists of only four rolling passes, namely a first rolling pass, a second rolling pass, a third rolling pass and a fourth rolling pass. In fact, four rolling units allow to obtain the desired reduction of the metal product P and to respect the desired tolerances in size and geometry. A lower number of rolling units would not allow to reach particularly accentuated rolling entities or to respect the desired tolerances. A higher number of rolling units, although it would allow to respect said conditions, on the other hand would increase the number of components of the rolling apparatus 10 with a consequent increase in the overall costs of the apparatus, in the wear to which they are subjected and in the maintenance operations periodically required.

Each rolling unit 11, 12, 13 and 14 is configured to progressively roll the entering metal product P and obtain at the end the rolled product L with the desired shape and sizes.

According to a possible embodiment of the present invention, the metal product P is fed to the first rolling unit 11 with a substantially circular cross section shape (FIG. 1), and an initial size, or initial diameter, D1.

According to a variant, not shown, the metal product P entering the first rolling unit 11 can have a cross section shape that is rectangular, square or in general polygonal with rounded edges. In this case the initial size of the metal product P is calculated as the equivalent diameter of the cross section of the metal product P.

The first rolling unit 11 is configured to obtain a first rolling pass on the metal product P and comprises at least two first rolling rolls 15 configured to roll the metal product P and obtain a first intermediate product P1 (FIG. 6) with a lozenge-shaped cross section, that is, rhomboid with opposite angles that are equal and adjacent angles different. The sides of the cross section of the lozenge instead are substantially equal in length and rounded in correspondence with the vertexes.

According to a possible solution, the first rolling unit 11 comprises only two first rolling rolls 15.

To this purpose, it can be provided that the first rolling rolls 15 together define between them a first rolling channel 16, also lozenge-shaped, suitable to define the cross section shape of the first intermediate product P1. Therefore, the first rolling channel 16 has a lozenge shape with opposite angles that are equal and adjacent angles different.

According to a solution shown in FIG. 1, each first rolling roll 15 comprises a first V-shaped circumferential throat 17.

According to a possible solution, the first circumferential throat 17 can have a vertex angle α with an amplitude comprised between 100° and 140°, preferably between 102° and 134°, varying according to the cross sections to be rolled.

The first circumferential throat 17 can be suitably rounded at the vertex for example with a rounded radius R1 which is about 40% of the initial diameter D1 of the metal product M that is rolled.

The first rolling channel 16 can be defined by a larger diagonal B1 and a smaller diagonal H1.

According to a possible solution, the larger diagonal B1 of the first rolling channel 16 is greater than or equal to the initial diameter D1 of the metal product P fed to the first rolling unit 11.

According to another solution of the present invention, the smaller diagonal H1 of the first rolling channel 16 is smaller than the initial diameter D1 of the metal product P, obtaining the rolling action on the latter.

This configuration of the first rolling channel 16 allows to induce on the metal product P being fed first compression stresses F1 in diametrically opposite positions of the cross section of the metal product P.

The first compression stresses F1 mainly act in a first direction T1 as shown in FIG. 5, corresponding during use with the direction of development of the first circumferential throats 17 of the first rolling rolls 15.

In the first rolling unit 11, the metal product P can be subjected to a reduction in cross section comprised between 12% and 48%.

In particular, the reduction in cross section is calculated by the formula:

$$RoA = (A\text{feed} - A\text{exit})/A\text{feed}$$

where:

RoA is Reducing of Area;

Afeed corresponds to the area of cross section at entry to the first rolling unit 11;

Aexit corresponds to the area of cross section at exit from the rolling unit or rolling units considered.

According to a possible solution, it can be provided that the first rolling rolls 15 are installed so that their axes of rotation extend parallel to a first direction Z1 which in this case is horizontal. The first direction Z1 is substantially orthogonal to the first direction T1 in which the first compression stresses F1 act.

The cross section of the first intermediate product P1 exiting from the first rolling unit 11 has a shape and size substantially equal to those of the first rolling channel 16, except for the elastic return of the material of the first intermediate product P1.

Therefore, the cross section of the first intermediate product P1 has a bigger diagonal B1 which is bigger than or equal to the initial diameter D1 of the metal product P, and a smaller diagonal H1 that is smaller than the initial diameter D1.

The particular lozenge shape of the cross section of the first intermediate product P1 allows to contain and hence to guide the material better through the successive rolling units located downstream, also preventing any lateral displacement of the first intermediate product P1.

The second rolling unit 12 is configured to obtain a second rolling pass, and hence to roll the first intermediate product P1 and obtain a second intermediate product P2, quadrangular in shape, that is, with angles substantially equal to each other and also extension sides that are substantially equal to each other and rounded in correspondence with the vertexes.

According to the solution shown in FIG. 2, the second rolling unit 12 comprises at least two second rolling rolls 18 configured to roll the first intermediate product P1 and obtain a second intermediate product P2 with a lozenge-shaped cross section.

To this purpose, it can be provided that the second rolling rolls 18 together define between them a second rolling channel 19, also quadrangular in shape, with substantially equal angles.

According to the solution shown in FIG. 7, the second rolling rolls 18 are each provided with a second circumferential throat 20, also V-shaped.

According to the solution in FIG. 7, the second circumferential throat 20 can have a vertex angle β with an amplitude comprised between 80° and 100°, preferably about 90°.

The second circumferential throat 20 can be suitably rounded at the vertex, for example with a rounded radius R2 that is about a third of the initial diameter D1 of the metal product M rolled.

The second rolling channel 19 has a first diagonal H2 and a second diagonal B2, the ratio of which is comprised between 0.9 and 1.1, preferably about 1, in practice defining a substantially square cross section with rounded edges.

The first diagonal H2 defines the distance between the vertexes of the product rolled by the second rolling rolls 18.

On the contrary, the second diagonal B2 defines the distance between the second circumferential throats 20 of the second rolling rolls 18.

According to a possible solution, the first diagonal H2 is bigger than the smaller diagonal H1, while the second diagonal B2 is smaller than the bigger diagonal B1.

This configuration of the second rolling channel 19 allows to induce on the material being worked second compression stresses F2, acting in opposite positions mainly along the bigger diagonal B1 of the first intermediate product P1.

In this way, a reduction is obtained in the sizes of the bigger diagonal B1 of the lozenge-shaped profile and a consequent increase in the smaller diagonal H1, due to the rolling forces induced in the profile itself.

The second compression stresses F2 act mainly in a second direction T2, as shown in FIG. 6, which is substantially orthogonal to the first direction T1.

An accentuated compression of the material initially in the first direction T1 and then in the second direction T2 allows to homogenize the deformation of the material in the whole of its thickness, in this way optimizing and homogenizing the mechanical resistance of the final rolled product L.

The particular rolling actions that are imparted by the first rolling unit 11 and second rolling unit 12 have the function of preparing the material and the entrance shape for subsequent introduction into the third rolling unit 13.

In the second rolling unit 12, the metal product P can be subjected to a reduction in cross section, calculated as described above, which is comprised between 12% and 38%.

According to the present invention, the first rolling unit 11 and second rolling unit 12 are configured to obtain a reduction in sizes of the cross section that can even exceed 66% of the initial sizes of the metal product P.

According to a possible solution, it can be provided that the second rolling rolls 18 are installed so that their axes of rotation extend parallel to a second direction Z2 which in this case is vertical. In this way the second rolling rolls 18 have axes of rotation that are orthogonal with respect to the axes of rotation of the first rolling rolls 15.

The cross section of the second intermediate product P2, at exit from the second rolling unit 12, has shape and sizes substantially equal to those of the second rolling channel 19, except for the elastic return of the material of the second intermediate product P2 which therefore has a first diagonal H2 and a second diagonal B2 substantially equal to those described above for the second rolling channel 19.

In this way a second intermediate product P2 is obtained with a substantially square cross section shape, with rounded edges and having sides practically equal to each other. This cross section shape is suitable for the subsequent feed into the third rolling unit 13.

The third rolling unit 13 is configured to obtain a third rolling pass, rolling the second intermediate product P2 to obtain a third intermediate product P3 with a round shape, not finished.

By the term round, we mean that the cross section of the product is circular, namely a section in which a predominant axis is not identifiable.

By the term not finished, we mean that the cross section of the product, while being close to round, does not yet respect predefined and preset tolerance limits. Only by way of example, in one possible solution, the intermediate product P3 has a round cross section with radiuses, evaluated in different angular position of the cross section, that can vary between 0.92 and 1.08, preferably between 0.95 and 1.05, more preferably between 0.98 and 1.02 with respect to the equivalent radius of the cross section of the intermediate product P3.

According to possible solutions of the present invention, the second intermediate product P2 is fed to the third rolling unit 13 with a maximum equivalent diameter of the cross section comprised between about 1.03 and about 1.20 times the desired diameter of the finished product exiting from the fourth rolling unit 14.

According to a possible solution, if the second intermediate product P2 has an equivalent diameter lower than 1.03 times the desired diameter of the finished product exiting from the fourth rolling unit 14, it can be decided whether it is appropriate to exclude the first rolling action of the first rolling unit 11.

According to one aspect of the present invention, the third rolling unit 13 comprises four third rolling rolls 21, configured to roll the second intermediate product P2.

In order to obtain a third intermediate product P3 with a round shape, the third rolling rolls 21 define between them a third rolling channel 22, substantially round and substantially mating with that of the third intermediate product P3 to be obtained.

The third rolling rolls 21 are each provided with a third circumferential throat 23 with an arched shape, in a circular sector.

According to a possible solution, the third rolling channel 22 can have a diameter K comprised between 0.92 and 0.98 with respect to the sizes of the first diagonal H2 and the second diagonal B2.

Diameter K substantially corresponds to the diameter of the third intermediate product P3 exiting from the third rolling unit 13, except for the elastic return of the material.

The presence of four third rolling rolls 21 allows to position each of them in correspondence with one of the four vertexes of the quadrangular cross section of the second intermediate product P2, and therefore fewer or more than four rolls would not allow to obtain the desired rolling action.

The third rolling rolls 21 therefore induce on the second intermediate product P2 third compression stresses F3 along each of the two diagonals of the cross section of the product which, in this case, are disposed respectively one vertical and one horizontal according to a "+" configuration.

In particular, the third compression stresses F3 act in a third direction T3 and a fourth direction T4 which are respectively parallel to the first direction T1 and the second direction T2 described above.

The third compression stresses F3 allow to flatten the rounded edges of the third quadrangular section and generate a rounding of the sides of the latter toward the outside.

According to a possible solution, it can be provided that the third rolling rolls 21 are disposed according to a "+" configuration, that is, disposing the third rolling rolls 21 so that the directions of development Y (FIG. 3) of the third circumferential throats 23 intersect with each other in correspondence with the center of the third rolling channel 22.

In the third rolling unit 13, the second intermediate product P2 can be subjected to a reduction in cross section that varies between 5% and 15% with respect to the entrance sizes into the third rolling unit 13.

At exit from the third rolling unit 13, the third intermediate product P3 has a substantially circular shape, not perfectly round, but guarantees a further gradual transformation that flattens the vertexes of the quadrangular section, and prepares the latter for the last rolling pass in the fourth rolling unit 14, which obtains a fourth rolling pass. In practice, the third rolling unit 13 allows to obtain the desired precision in size in the fourth rolling unit 14.

The third intermediate product P3 is subsequently fed to the fourth rolling unit 14, or finishing unit, in which it is rolled and calibrated to obtain the final rolled product L with a round and calibrated cross section shape, that is, which respects predefined tolerances of shape and geometry, or shape.

According to the present invention, it is possible to reach tolerances of size comprised between ±0.1 mm, and even less. Moreover, it is also possible to reach a tolerance on the oval shape of the rolled product L that is less than 0.1 mm.

According to another aspect of the present invention, the fourth rolling unit 14 comprises four fourth rolling rolls 24, configured to roll the third intermediate product P3.

The fourth rolling rolls 24 are provided with fourth circumferential throats 25 having an arched shape, in a circular sector and defining, in their entirety, a fourth rolling channel 26, circular in shape and suitably calibrated to guarantee said tolerances are obtained in the rolled product L.

Each of the fourth rolling rolls 24 acts on one of the sides of the quadrangular section of the second intermediate product P2, that is, in an angularly offset direction with respect to the direction of action of the third rolling rolls 21.

In fact, the fourth rolling rolls 24 induce fourth compression stresses F4 on the third intermediate product P3, acting in a fifth direction T5 and a sixth direction T6 of action which are angled with respect to the third T3 and fourth T4 direction of action of the third compression forces F3.

According to the solution shown in FIG. 8, the fifth direction T5 and the sixth direction T6 of action of the fourth compression stresses F4 are angularly distanced by about 45° with respect to the third direction T3 and the fourth direction T4.

In this case therefore, the fourth rolling rolls 24 are disposed in an "X" configuration, that is, disposing the fourth rolling rolls 24 so that the directions of development Q of the fourth circumferential throats 25 intersect in correspondence with the center of the fourth rolling channel 26.

The directions of development Q in this case are disposed angularly offset, in this case by 35°, with respect to the direction of development Y of the third circumferential throats 23.

According to a possible solution, in the fourth rolling unit 14 the third intermediate product P3 can be subjected to a reduction in cross section of about 5%, or less.

In the third 13 and fourth rolling unit 14 the material is subjected to deformation stresses that are lower than those to which it was previously subjected in the first 11 and second rolling unit 12. In fact, in the third 13 and fourth rolling unit 14 the rolling action is not such as to generate tensions inside the material which can compromise the mechanical resistance of the material.

The configuration with four rolling rolls, both in the third rolling unit 13 and the fourth rolling unit 14, allows to extend the range of sizes of the products that can be processed, without requiring a replacement of the rolling rolls, but only by varying the sizes of the rolling channel defined between them.

Merely by way of example, it can be provided that with a set of rolls of the first 11, second 12, third 13 and fourth rolling unit 14, it is possible to process bars with sizes varying between 36 mm and 44 mm, without needing to replace the respective rolls, and respecting the tolerances described above.

This advantage is also obtained thanks to the particular shape of the first rolling channel 16 which, even if the sizes are modified, for example because it is required to process a metal product M with different sizes, it is possible to guarantee, in the downstream passes, for example in the second pass, that the desired shapes are obtained, for example quadrangular and then round.

It is clear that modifications and/or additions of parts may be made to the method and apparatus for rolling metal products 10 as described heretofore, without departing from the field and scope of the present invention.

It is also clear that, although the present invention has been described with reference to some specific examples, a person of skill in the art shall certainly be able to achieve many other equivalent forms of method and apparatus for rolling metal products 10, having the characteristics as set forth in the claims and hence all coming within the field of protection defined thereby.

What is claimed:

1. Method for rolling metal products comprising a plurality of sequential rolling passes during which a metal product (P) having an initial size is rolled, the method consisting of:
    a first rolling pass of said metal product (P) to obtain a first intermediate product (P1) with a lozenge-shaped cross section, with opposite angles equal to each other and different adjacent angles;
    a second rolling pass of said first intermediate product (P1) to obtain a second intermediate product (P2) with a quadrangular shape of the cross section with angles substantially equal to each other;
    a third rolling pass of said second intermediate product (P2) to obtain a third intermediate product (P3) with a round shape of the cross section, not finished; and
    a fourth rolling pass of said third intermediate product (P3) to obtain a final rolled product (L) with a round, calibrated shape of the cross section.

2. Method as in claim 1, wherein said first rolling pass is carried out by two first rolling rolls (15) defining a first rolling channel (16) between them, also with a lozenge shape, wherein said second rolling pass is carried out by two second rolling rolls (18) defining between them a second rolling channel (19) with a quadrangular shape, with angles substantially equal to each other, and wherein said third rolling pass is carried out by four third rolling rolls (21), and said fourth rolling pass is carried out by means of four fourth rolling rolls (24).

3. Method as in claim 2, wherein first compression stresses (F1) are induced in said first rolling pass, acting in a first direction (T1) and in diametrically opposite positions of said metal product (M), and second compression stresses (F2) are induced in said second rolling pass, acting in a second direction (T2), orthogonal to said first direction (T1), and in opposite positions of said first intermediate product (P1).

4. Method as in claim 1, wherein said first rolling pass and said second rolling pass induce a reduction in sizes of the cross section even more than 66% of the initial sizes of the metal product (P).

5. Method as in claim 2, wherein said third rolling rolls (21) each act in correspondence to one of the four vertexes of the quadrangular cross section of the second intermediate product (P2), in order to flatten said vertexes.

6. Method as in claim 2, wherein said fourth rolling rolls (24) each act in correspondence with one of the four sides of the quadrangular cross section of the second intermediate product (P2).

7. Method as in claim 1, wherein during said third rolling pass said second intermediate product (P2) is subjected to a reduction of the cross section comprised between 5% and 15%.

8. Method as in claim 1, wherein during said fourth rolling pass said third intermediate product (P3) is subjected to a reduction of the cross section of about 5%, or less.

9. Apparatus for rolling metal products comprising a plurality of rolling units, the apparatus consisting of:
    a first rolling unit (11) provided with first rolling rolls (15) defining a first rolling channel (16) with a lozenge shape with opposite angles equal to each other and different adjacent angles;
    a second rolling unit (12) provided with second rolling rolls (18) defining a second rolling channel (19) with a quadrangular shape, with angles substantially equal to each other;

a third rolling unit (13) provided with third rolling rolls (21) defining a third rolling channel (22) with a round shape;

a fourth rolling unit (14) provided with fourth rolling rolls (24) defining a fourth rolling channel (26) with a circular shape.

10. Apparatus as in claim 9, wherein said first rolling unit (11) comprises two first rolling rolls (15) each provided with a first V-shaped circumferential throat (17), wherein said second rolling unit (12) comprises two second rolling rolls (18) with axes of rotation orthogonal to those of the first rolling rolls (15) and each provided with a second V-shaped circumferential throat (20), and wherein said third rolling unit (13) and said fourth rolling unit (14) comprise four third rolling rolls (21) and respectively four fourth rolling rolls (24), each of said third rolling rolls (21) and fourth rolling rolls (24) being provided with a circumferential throat (23, 25) with an arched shape, with a circular sector.

11. Apparatus as in claim 10, wherein said first circumferential throat (17) has an angle ($\alpha$) at the vertex with an amplitude comprised between 100° and 140°, between 102° and 134°.

12. Apparatus as in claim 10, wherein said second circumferential throat (20) has an angle ($\beta$) at the vertex with an amplitude comprised between 80° and 100°, about 90°.

* * * * *